United States Patent
Hunacek et al.

(10) Patent No.: US 10,015,564 B2
(45) Date of Patent: *Jul. 3, 2018

(54) METHOD TO WATERMARK A COMPRESSED CONTENT ENCRYPTED BY AT LEAST ONE CONTENT KEY

(71) Applicant: NAGRAVISION S.A., Cheseaux-sur-Lausanne (CH)

(72) Inventors: Didier Hunacek, Blonay (CH); Patrick Servet, Cheseaux-sur-Lausanne (CH); Minh Son Tran, Bourg la Reine (FR); Pierre Sarda, Echallens (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/661,954

(22) Filed: Jul. 27, 2017

(65) Prior Publication Data

US 2017/0339472 A1 Nov. 23, 2017

Related U.S. Application Data

(63) Continuation of application No. 14/786,905, filed as application No. PCT/EP2014/058628 on Apr. 28, 2014, now Pat. No. 9,729,941.

(30) Foreign Application Priority Data

Apr. 26, 2013 (EP) ..................................... 13165597

(51) Int. Cl.
*H04L 9/32* (2006.01)
*H04N 21/8358* (2011.01)
(Continued)

(52) U.S. Cl.
CPC ..... *H04N 21/8358* (2013.01); *H04N 21/4405* (2013.01); *H04N 21/63345* (2013.01);
(Continued)

(58) Field of Classification Search
CPC ........... H04N 21/8355; H04N 21/8358; H04N 21/6334; H04N 21/63345; H04N 21/4405;
(Continued)

(56) References Cited

U.S. PATENT DOCUMENTS 5,530,751 A 6/1996 Morris
5,574,787 A 11/1996 Ryan
(Continued)

FOREIGN PATENT DOCUMENTS

EP 1 968 316 9/2008
EP 2 391 125 11/2011
(Continued)

OTHER PUBLICATIONS

International Search Report issued in International Application No. PCT/EP2014/058628 dated Aug. 21, 2014.
(Continued)

*Primary Examiner* — Jayesh M Jhaveri
(74) *Attorney, Agent, or Firm* — DLA Piper LLP (US)

(57) ABSTRACT

A system and method to watermark a compressed content encrypted by at least one content key, said content key as well as pre-marking data forming Conditional Access System (CAS) data, said CAS Data being encrypted by a transmission key and comprising at least one signature to authenticate all or part of the CAS Data, said compressed content being received by a client device comprising: a Descrambler having an input to receive the encrypted compressed content and an output to produce an compressed content, a Watermark (WM) inserter directly connected to
(Continued)

the output of the Descrambler, said Descrambler and said WM inserter being connected with a Conditioner, said Conditioner executing the following steps: receiving the CAS Data, decrypting the CAS Data with the transmission key, verifying the signature of the CAS Data, and if the signature is valid, transferring the content key to the descrambler and the pre-marking data to the WM inserter, and watermarking by the WM inserter, the decrypted content received by the descrambler using the pre-marking data and the identifier.

16 Claims, 2 Drawing Sheets

(51) Int. Cl.
  *H04N 21/4405*   (2011.01)
  *H04N 21/6334*   (2011.01)
  *H04N 21/8355*   (2011.01)
  *H04N 7/167*   (2011.01)
  *G06F 21/16*   (2013.01)
  *G06F 21/10*   (2013.01)
  *H04N 1/32*   (2006.01)

(52) U.S. Cl.
  CPC ......... *H04N 21/8355* (2013.01); *G06F 21/10* (2013.01); *G06F 21/16* (2013.01); *H04N 1/3232* (2013.01); *H04N 7/1675* (2013.01); *H04N 21/6334* (2013.01)

(58) Field of Classification Search
  CPC .... H04N 7/1675; H04N 1/3232; G06F 21/10; G06F 21/16
  See application file for complete search history.

(56) References Cited

U.S. PATENT DOCUMENTS

| | | | |
|---|---|---|---|
| 5,579,390 A | 11/1996 | Ryan et al. | |
| 5,651,065 A | 7/1997 | Stufflet et al. | |
| 5,809,139 A * | 9/1998 | Girod | G06T 1/0035 375/E7.026 |
| 6,285,774 B1 | 9/2001 | Schumann et al. | |
| 6,363,149 B1 | 3/2002 | Candelore | |
| 7,050,588 B1 | 5/2006 | Wajs et al. | |
| 7,073,073 B1 * | 7/2006 | Nonaka | G06F 21/10 380/277 |
| 7,516,491 B1 | 4/2009 | Schlafly | |
| 7,761,465 B1 | 7/2010 | Nonaka et al. | |
| 8,336,106 B2 | 12/2012 | Le Buhan et al. | |
| 8,571,213 B2 | 10/2013 | Tran et al. | |
| 8,601,590 B2 | 12/2013 | Nakano et al. | |
| 8,861,729 B2 | 10/2014 | Folea et al. | |
| 2002/0120574 A1 | 8/2002 | Ezaki | |
| 2002/0146123 A1 | 10/2002 | Tian | |
| 2002/0186844 A1 | 12/2002 | Levy et al. | |
| 2003/0016756 A1 | 1/2003 | Steenholf et al. | |
| 2003/0074553 A1 | 4/2003 | Arkko et al. | |
| 2003/0103645 A1 | 6/2003 | Levy et al. | |
| 2003/0112974 A1 | 6/2003 | Levy | |
| 2004/0098603 A1 | 5/2004 | Corinne | |
| 2005/0096753 A1 | 5/2005 | Arling et al. | |
| 2005/0273862 A1 | 12/2005 | Benaloh et al. | |
| 2007/0192610 A1 | 8/2007 | Chun et al. | |
| 2008/0219643 A1 | 9/2008 | Le Buhan et al. | |
| 2009/0290711 A1 * | 11/2009 | Bloom | H04N 7/163 380/239 |
| 2010/0070991 A1 | 3/2010 | Kaag et al. | |
| 2010/0128871 A1 | 5/2010 | Folea et al. | |
| 2010/0208891 A1 | 8/2010 | Folea et al. | |
| 2011/0293092 A1 | 12/2011 | Tran et al. | |
| 2012/0114118 A1 | 5/2012 | Verma | |
| 2013/0142382 A1 * | 6/2013 | Petrovic | G06F 21/10 382/100 |
| 2014/0040623 A1 | 2/2014 | Conus et al. | |
| 2014/0086408 A1 | 3/2014 | Bickmore et al. | |
| 2015/0016663 A1 * | 1/2015 | Tehranchi | G06T 1/0035 382/100 |

FOREIGN PATENT DOCUMENTS

| | | |
|---|---|---|
| WO | WO 2009/144111 | 12/2009 |
| WO | WO 2012/143880 | 10/2012 |

OTHER PUBLICATIONS

Written Opinion issued in International Application No. PCT/EP2014/058628 dated Aug. 21, 2014.
International Search Report issued in International Application No. PCT/EP2014/057342 dated Aug. 21, 2014.
Written Opinion issued in International Application No. PCT/EP2014/057342 dated Aug. 21, 2014.
International Search Report issued in International Application No. PCT/EP2014/057331 dated Aug. 21, 2014.
Written Opinion issued in International Application No. PCT/EP2014/057331 dated Aug. 21, 2014.
File History of U.S. Appl. No. 14/786,913.
File History of U.S. Appl. No. 14/786,905.
File History of U.S. Appl. No. 14/786,917.
File History of U.S. Appl. No. 15/424,590.

* cited by examiner

METHOD TO WATERMARK A COMPRESSED CONTENT ENCRYPTED BY AT LEAST ONE CONTENT KEY

CROSS REFERENCE TO RELATED APPLICATIONS

This is a continuation application of application Ser. No. 14/786,905 filed Oct. 23, 2015, which is a U.S. National Stage Application of International Application No. PCT/EP2014/058628 filed Apr. 28, 2014, which claims priority from European Patent Application No. 13165597.9 filed Apr. 26, 2013. All of the foregoing are incorporated by reference in their entireties.

BACKGROUND ART

Watermarking is a technique utilized to tag protected contents. This tag is used to detect unauthorized use or illegal copies of the protected contents. The watermarking technique consists to embed a digital mark into the content. From the viewpoint of appearance, the embedded digital mark can be either invisible or visible. From the viewpoint of the information-nature, this digital mark could be a unique value or a generic symbol depending on what the owner of the content wants to monitor. Especially in the case of the unique value, the watermarking insertion should be done in the final client device because the mark shall contain an identifier of this device.

The goal of the watermarking technique is to hide as much as possible the embedded mark/hidden information by spreading one of its representations into the content. To ensure the discretion of the mark insertion without any compromise on the quality, the insertion requires generally a complex even exhibitive computing capacity for given devices. Consequently, the complete computation is often divided into pre- and post-process. The pre-process performs most of the heavy operations which generates some cues called Watermarking Metadata (WMDs) which aid the much lighter post process to effectively insert the mark. "Where to modify", "how to modify" is typically the information contained in the WMDs. This could be in the form of a file of pre-marking records, each containing a content index in the form of an address of the block to be marked and with at least one alternate value. At the client device, each record is processed and the alternate value is selected (or not selected) according to the bit of the identifier to be included into the content.

Therefore the secrecy of the WMDs as well as their insertion shall be ensured, especially when the post-process is performed, inside the client device, to avoid the ability of filtering, removing and/or cropping them. At the client device, existing digital watermarking processing techniques are generally controlled by application software (HOST CPU) of the device meaning that in some cases the unprotected and still unmarked content could be accessible by the software of the client device. Therefore the security of the digital watermarking processing depends on the security of the software running on the device i.e. how easy it is to modify and then to by-pass the digital watermarking processing when the device is successfully attacked or just open (no software authentication).

The document US2010/128871 describes a solution in which a secondary stream is generated comprising the data allowing to reconstruct the main stream and at the same time to marl the reconstructed stream. As a consequence, the same stream contains the scrambling data and the watermarking data. At the reception, this stream is processed as one set of data to be replaced in the modified stream.

The document EP 2 391 125 describes a solution to allow an individual marking (at the reception device) based on a stream common to all devices. The control object contains the original value, an alternate value and a location. The security unit determines a mathematical operation to be applied on the alternate value to retrieve the original value. The mathematical operation is changed according to an internal parameter of the reception device so that the mathematical operation will be unique per device, allowing to track this device if the stream of descrambling data is analyzed.

BRIEF DESCRIPTION OF THE INVENTION

The aim of the present invention is to enforce the watermarking on a content received by a client device, in particular to compressed video content.

The present invention proposes a method to watermark a compressed content encrypted by at least one content key (CA key), the content key (CA key) being part of an Entitlement Control Message (ECM) and encrypted by a first transmission key, the pre-marking data being encrypted by a second transmission key and being authenticated with a signature, said compressed content being received by a client device comprising:
  a Descrambler (103) having an input to receive the encrypted compressed content and an output to produce a decrypted compressed content,
  a WM inserter (104) directly connected to the output of the Descrambler,
said Descrambler and said WM inserter being connected with the Conditioner (200), said Conditioner executing the following steps:
  receiving the Entitlement Control Message and the pre-marking data,
  decrypting the Entitlement Control Message with the first transmission key and extracting the content key (CW),
  decrypting the pre-marking data with the second transmission key,
  verifying the signature of the pre-marking data, and if the signature is valid,
  transferring the content key (CA key) to the descrambler (103) and the pre-marking data to the WM inserter,
  watermarking by the WM inserter, the decrypted content received by the descrambler using the pre-marking data and the identifier.

BRIEF DESCRIPTION OF THE FIGURES

The present invention will be better understood thanks to the attached figure in which.

DETAILED DESCRIPTION

Figure 1:
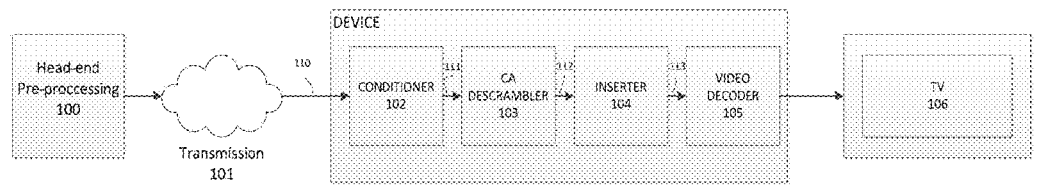
FIG. 1 illustrates an example of the watermarking flow.

Conditional access data comprises a content (video or audio data or combination thereof) encrypted by one or a plurality of content keys. The access to this content is possible thanks to CAS data, these data comprising the key or keys (CA KEY) to decrypt the encrypted content, and the pre-marking data WM. The WMDs are a set of records allowing the WM Inserter to determine where a modification in the descrambled content can be made. This is generally in the form of a set of records, each record comprising a location (or address, offset, index) and at least one alternate value. This alternate value can (or cannot, depending of the bit to be embedded) replace the original value at the specific location in the content. In case of two alternate values, the bit to be embedded as Watermark can be used to select one or the other value. The CAS data also comprises access conditions associated with the content describing the condition to be met by the decoder to decrypt the content. The Conditioner comprises access rights describing the access conditions of the client device. The access rights are preferably loaded into the Conditioner by an Entitlement Management Message (EMM) encrypted by a key unique for said Conditioner. The conditional access data are broadcasted, unicasted or sent on request of the recipient. The CAS data can be part of the conditional access data (for example a sub-stream with a particular PID value) or sent separately to the client device.

On the server side, the compressed content is encrypted by one or a plurality of keys, in the second case, the content is partitioned and each partition is encrypted by a different key. The server also prepares the Watermark Data (WMDs) as a set of records by an analyzing module in order to detect possible marking position on the compressed content (before the encryption step). The result of the analysis module is to produce at least one alternate value per record, this alternate value, when substituted in the compressed content does not visually alter the content but can be detected later. The WMDs or pre-marking records comprise, for each record, a content index (i.e. the location in which the modification can be made) of the content to be modified and the alternate value to insert. The pre-marking records are not determined according to a particular identifier, it is only values that can help the watermark at the client device to embed the mark according to a local identifier without further processing (hence reduce the required complexity of the client device).

Once received in the client device, in case that the CAS Data are embedded in the conditional access data, they are extracted and forwarded to a Conditioner (see FIG. 2), in charge of the enforcement of the security measures defined in the conditional access conditions. This module comprises the first transmission key necessary to decrypt the CAS data and to extract from the CAS data the key (CA Key) then to transfer it to the CA descrambler in order to decrypt the content. In addition to the key, this module extracts also the WMD, encrypted by a second transmission key. In case that the WMD are in the same message as the CA key, one transmission key is used to encrypt the message. In a particular embodiment, the first and the second key is the same transmission and is used to decrypt the CAS Data and the WMD. It is to be noted that the communication between the Conditioner and the CA Descrambler is encrypted and protected by a key initialized on both elements. Another method to ensure that the communication between these two elements is secure is to use dedicated bus, i.e. not accessible by the Host CPU (203) running on the client device.

A similar protection applies on the communication between the Conditioner and the WM Inserter.

The proposed solution protects the WMDs against spying but also protects the WMDs against any easy filtering or removing. The solution enforces also robust detections of the WMDs and guarantees also a correct insertion of the mark. Exemplary aspects of the invention may comprise a Conditioner which receives the WMDs, a CA descrambler which descrambles the content and a Watermark inserter which inserts the mark by using the WMDs.

FIG. 1 is an exemplary application of the watermarking process. For example, the head-end 100 pre-processes the content to find the right places to insert a mark in the compressed content to form the WMDs. At that stage, the Watermarking data are client device agnostic and are common to all client devices. This information together with the content protected by the Conditional Access System (CAS) is then transmitted 101 to the final client device, for example, by using the satellite. The protected content 110 enters into the device. In this example illustrated by FIG. 1, the CA key used to descramble the content and the WMDs are transmitted in the content itself. The Conditioner 102 extracts the protected CA key and the protected WMDs from the channel used to transmit them. It also decrypts and authenticates this two-tuples: CA key-WMDs.

Figure 2:
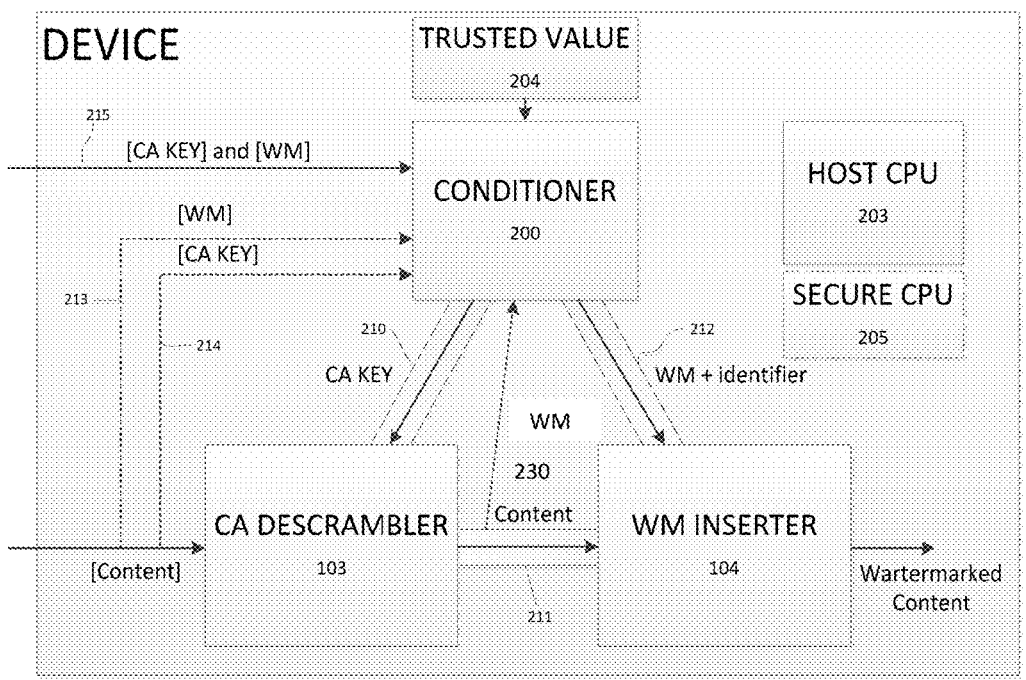
FIG. 2 illustrates a block diagram of the watermarking insertion process.

According to an alternate embodiment, the Conditioner transmits the CAS Data to a secure element i.e. the secure CPU 205 (see FIG. 2). This secure element can be part of the client device, e.g. a protected software environment dedicated to the security operations. It can be also a detachable security element such as a smartcard, dongle or PCMCIA module. Once the CAS data are decrypted and authenticated by the secure element, the CA key and the WMD are returned to the Conditioner. The communication between these two elements is preferably secured by a pairing key i.e. the same key is loaded during an initialization phase in the Conditioner and the secure element.

The protected content 111 is transmitted to the CA descrambler 103. If the Conditioner 102 successfully decrypts the protected CA key and protected WMDs and authenticates the CA key and the WMDs, it could transmit the CA key to the CA descrambler 103 and the WMDs to the WM inserter 104. The CA descrambler 103 uses the CA key to de-protect the content 112. The un-protected content goes into the WM inserter 104. The WM inserter 104 is responsible to synchronize the WMDs (coming from the Conditioner 102) and the content to insert at the right places the mark. Then, the marked and descrambled content 113 is passed to the video decoder 105, which decodes the marked content. The TV 106 receives a marked and un-compressed content.

The authentication is based on signatures. For example the Watermark data comprises a signature for authenticating the origin of the data. The signature is the result of the encryption of a digest of the payload (e.g. the pre-marking records). The digest is calculated by the head-end pre-processing 100 (using for example a hash function) and encrypted by a signature key to produce the signature. This signature is added into the message and the message is preferably encrypted by a transmission key. On the reception side, the message is first decrypted and the digest is calculated on the payload. With the key corresponding with the signature key, the received signature is decrypted and the result is compared with the calculated digest. If both values are the same, the message is authentic. The signature key can be a symmetric key or an asymmetric key (public/private keys).

FIG. 2 is a block diagram illustrating a robust watermark inserting system. The device may comprise a Conditioner 102, a CA descrambler 103, a HOST CPU 203, a WM inserter 104 and optionally a secure CPU 205.

The secure CPU 205, if used, may comprise circuitry, logic and/or code that ensure the control and the customization of the watermarking process. The secure CPU 205 shall be completely isolated from the HOST CPU 203 so that untrusted software (firmware) could not run on it.

The Conditioner 102 may comprise circuitry, logic and/or code that receives (extracts), decrypts and authenticates the protected CA key and the protected WMDs. If a code is used, this code shall be encrypted and authenticated by the secure CPU 205. The Conditioner 102 shall also have access to a non-modifiable and Trusted Value 204 (identifier, timestamp, . . . ). The Conditioner 102 is also in charge of activating the WM inserter 104. The conditions contained in the CAS data can contain instructions to choose the identifier that will be implemented as watermark into the content. It could be a unique identifier of the client device, preferably stored in the secure environment of the conditioner or an identifier contained in the CAS data (e.g. an identifier of the originator of the content).

The CA descrambler 103 may comprise circuitry, logic and/or code to descramble a protected content with a CA key coming from the Conditioner 102. If a code is used, this code shall be decrypted and authenticated by the secure CPU 205 and safely stored.

The WM inserter 104 may comprise circuitry, logic and/or code to insert a mark into the un-protected content with the WMDs and the identifier coming from the Conditioner 102. If a code is used, this code shall be decrypted and authenticated by the secure CPU 205. Another important task of the WM inserter 104 is to synchronize the WMDs, which indicate where to insert the mark, with the content.

The HOST CPU 203 may comprise circuitry, logic and/or code that ensure the overall functionalities of the device. The HOST CPU 203 could not have access to the CA Key, the WMDs and the un-protected content between the CA descrambler 103 and the WM inserter 104.

The secure link 210, 211 and 212 may comprise private bus, logic and/or RAM not accessible by the HOST CPU 203. Only the entities linked by the secure link could have access to the transmitted data. For example, only the CA descrambler 103 and the Conditioner 102 could have access to the CA key.

Apart from the above mentioned process, the purpose of this invention is also to prevent an easy filtering of the protected WMDs. The protected CA key could not be removed by an attacker otherwise the content will not be decrypted. For the protected WMDs, the goal is to hide as much as possible, from the HOST CPU 203 standpoint, their detection. The ideal scenario will be that the protected WMDs could only be extracted by and visible from the Conditioner 102. However in most of the cases, the protected WMDs are nonetheless accessible by the HOST CPU 203 and therefore the goal is to force the HOST CPU 203 to pass the protected WMDs to the Conditioner 102. Before talking about some means to enforce the protected WMDs to be passed to the Conditioner 102, the following list summarizes some possible channels from where the protected CA key and protected WMDs could come:

The protected CA key and the protected WMDs could come directly through Ethernet from a server.

The protected CA key and the protected WMDs could be stored in a manifest (like DASH).

The protected CA key and the protected WMDs could be embedded in the content. For example, the Conditioner 102 could receive the protected CA key in an ECM and the protected WMDs could be extracted by the Conditioner 102 before the CA descrambler 103 (FIG. 1). Another example illustrated in FIG. 2 shows that the WMDs are embedded into the content and only available after the descrambler CA Descrambler (dotted line 230 from the output of the Descrambler). The WMDs are then protected, i.e. encrypted with the CA key. A filter is located at the output of the CA Descrambler so that the sub-stream of the WMDs is extracted and passed to the Conditioner. The WMDs extracted from the CA descrambler can be further encrypted by a specific WM key known by the Conditioner. In order to control the authenticity of the WMDs, these data can further contain a signature. These data are organized in packets and each packet contains a packet signature. The signature, as an example of realization, is the hash value of the other data of the packet, this hash value being encrypted by a signature key. When the Conditioner receives the WMDs, it then decrypts the packet signature and compares it with a hash value of the data of the packet. If the signature is successfully verified, the Conditioner validates the current CA key and continues to feed the CA Descrambler with the future CA keys; in the contrary the blocking mechanism described above is enabled.

In this configuration, the Conditioner 200 should firstly load the CA key into the CA Descrambler 103 before receiving the WMDs. For that purpose, the Conditioner comprises a timer which is initialized when the CA key is loaded into the Descrambler. If after a first predefined time, the WMDs are not received by the Conditioner, the latter blocks the Descrambler. This can be done by sending a fake CA key to the Descrambler or blocking the further transmission of the new CA keys. The timer can be used to release the blockage after a second predefined time. When this second time is over, the Conditioner transfers the current CA key and waits for the reception of the WMDs. The timer is reinitialized if the WMDs are not received during the first predefined time, the Conditioner re-enters into the blocking mode.

In the embodiment in which the CA Key and the WDMs are sent together, the main idea to enforce the protected WMDs to be given to the Conditioner 102 is to bind cryptographically with a signature mechanism (e.g. SHA-256) the CA key and the WDMs. This computation could only be handled in the Conditioner 102. For example, a Video on Demand content is encrypted with a unique CA key and all the Protected WMDs are stored in a file. To decrypt the content, the Conditioner 102 shall receive the protected CA key and all the Protected WMDs otherwise the signature check done on the CA key and the WMDs will fail and the content will not be decrypted because the Conditioner 102 will not provide the CA key to the CA descrambler 103.

Figure 4:
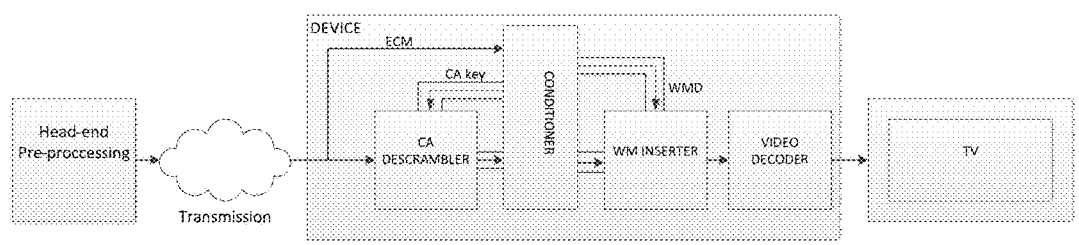
FIG. 4 illustrates an example in which the watermark data are contained in the data flow.

However, the cryptographic binding between the CA key and the WMDs is not always possible. For instance, CA key is completely uncorrelated with the protected media data, which are closely linked to WMDs in a MPEG-TS transmission. The WMDs themselves can be also protected with the CA key as a kind of media data. In this case, the protected WMDs shall be invisible for the HOST CPU 203 standpoint. Only the Conditioner 102 can detect them and use them. To illustrate this, FIG. 4 shows the transmission of MPEG-2 TS content. In this example, the WMDs are included in a particular Packetized Elementary Stream (PES) and then mixed together with other PESs of the content. The payload of this PES is encrypted by a key known only by the Conditioner 102. These PESs and the normal PESs are encapsulated in TS packets and then encrypted by the scrambler (e.g. DVB-CSAV2). From the HOST CPU 203 standpoint, there are no differences between a TS packet containing a normal PES and the one containing a WMD PES. The CA descrambler 103 decrypts the TS packet and then the Conditioner 102 detects the protected WMDs by using specific flags. Then it could decrypt them and pass them to the WM inserter 104.

Another example illustrated by the FIG. 1 is focused on how to enforce the watermarking process. The Conditioner 102 is placed before the CA descrambler 103. The Conditioner 102 extracts the protected WMDs and then decrypts them. In this case the detection of the protected WMDs is easier and can be potentially done by the HOST CPU 203. To prevent the filtering of the protected WMDs, the marking technique described in the patent application published under No EP2458890 is used. With this technique, if the protected WMDs are filtered, the content will suffer from a considerable degradation. According to this example, the content descrambled by the CA Descrambler is not the same as the original one and so-called modified content. This modified content still comprises some values (e.g. correlation coefficients) altered by the head end, the original values being part of the watermarking data. During the watermarking process, executed by the WM Inserter, the pre-watermark record comprises two values, one being the original value and the other one being an alternate value. This alternate value is chosen so that the visual impact is minimal.

Figure 3:
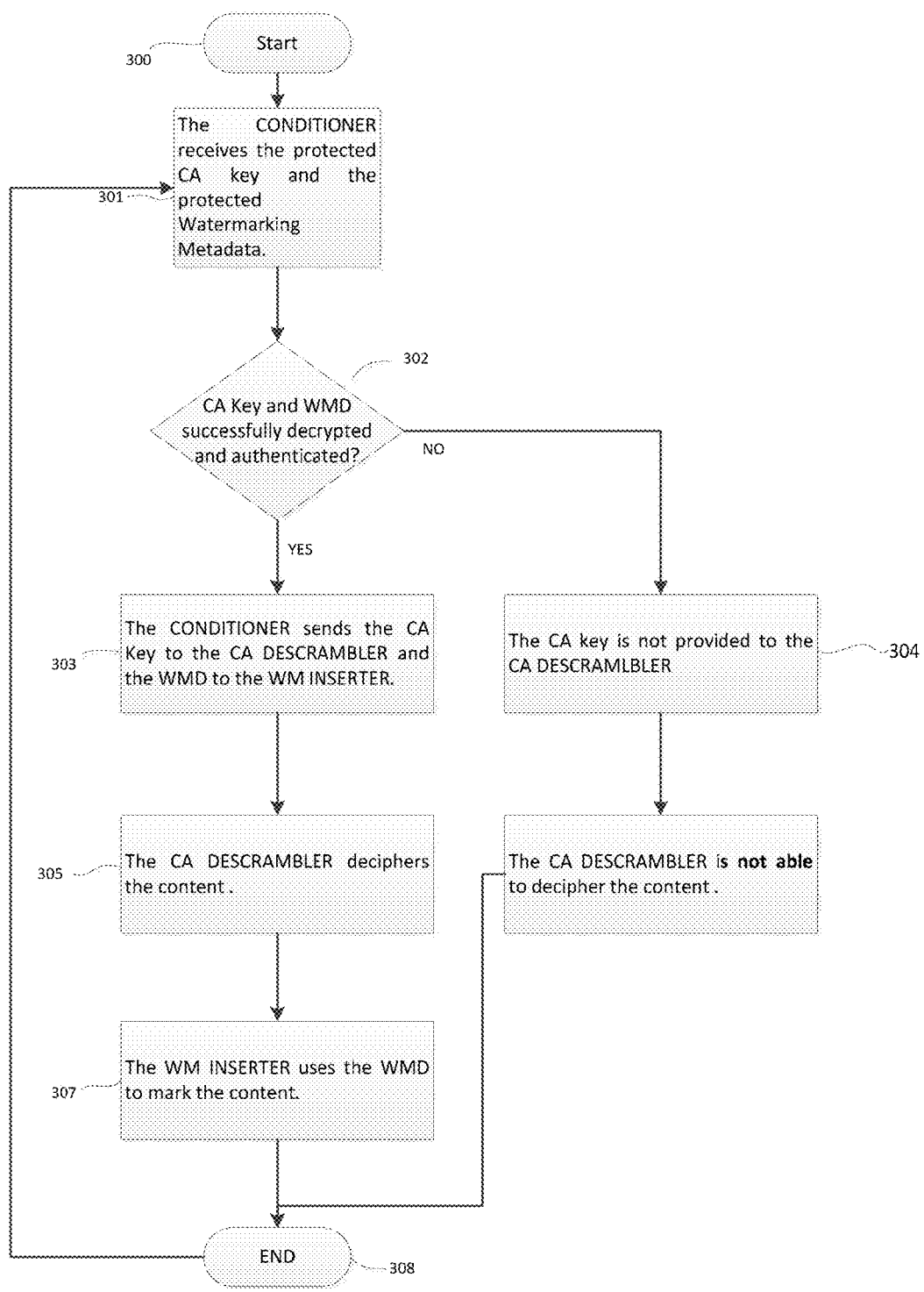
FIG. 3 illustrates a flow diagram of the watermarking process.

FIG. 3 is a flow diagram of an exemplary watermarking process. In step 301, after start in step 300, the Conditioner 102 is in charge of receiving, decrypting and authenticating the CA key and the WMDs. In step 302, the Conditioner decrypts and checks the signature done on the CA key and the WMDs. If the CA key and the WMDs could not be authenticated correctly the content is not decrypted because the Conditioner 102 will not provide the CA key to the CA descrambler 103 (step 304). By using this trick, the HOST CPU 203 is obliged to pass the protected CA key and the protected WMDs to the Conditioner 102 without any modification or filtering. If everything is ok, the Conditioner 102 is also in charge of providing the WMDs and the Trusted Value to the WM inserter in the same time as the CA key for the CA descrambler 103 (step 303). The Trusted Value is used to uniquely identify the device. For instance, this Trusted Value could be set and locked at the configuration of the device.

This Trusted Value, as part of the device, is accessible by the Conditioner and furthermore not modifiable by any entity in the device. Some computations may be done on this Trusted Value inside the Conditioner before being used as watermark payload, to improve the robustness to this payload. E.g. the Trusted Value could be a unique identifier which may be transformed/enhanced through an ECC, or an anti-collusion code, like Tardos code.

Then in step 305, the CA descrambler descrambles the protected content. After that, in step 307, this un-protected content is provided to the WM inserter to be marked. The WM inserter uses the WMDs and the Trusted Value to correctly insert the mark into the content. The un-protected content is never accessible by the HOST CPU before it has correctly been marked. In step 308, if another CA Key and/or new protected WMDs are coming, the process shall jump into step 301.

The WM inserter can comprise a verification module in charge of checking that the compressed content is the one that is actually decrypted by the descrambler. The first verification is based on the reception of compressed data. If no data are received at the input of the WM inserter, a message is sent back to the Conditioner which wills in return stops to provide the CA key to the descrambler.

Another verification, which can be added to the previous one or implemented independently, aims at recognizing the content to be watermarked. The WM records not only comprise the content index and an alternate value but also the original value of the content at the location pointed by the content index. During the watermarking step, the WM inserter decides to change the original value of the content by an alternate value (or leave the original one) according to the value of a bit of the identifier. In addition to this operation, the WM inserter can read the original value from the descrambled compressed content and compare it with the original value contained in the pre-marking record. If the values are the same, the content currently in process is the genuine one. If the original value read from the content is different, it means that another compressed content is feed to the input of the WM inserter. In this case, a message is sent to the Conditioner to take the appropriate action (disabling the CA key for example).

The invention claimed is:

1. A method to allow watermarking a content by a client device, the method comprising, at a server side:
   encrypting a compressed content by at least one content key;
   generating an entitlement control message (ECM) and pre-marking data, the ECM including the at least one content key, the ECM being encrypted by a first transmission key, the pre-marking data being encrypted and comprising a signature of the pre-marking data;
   sending the encrypted compressed content to a client device; and
   sending the entitlement control message (ECM) and the pre-marking data to the client device;
   the pre-marking data being formatted to be decrypted by the client device, and in response to a verification of the signature by a conditioner of the client device, transferred from the conditioner to a watermark (WM) inserter of the client device;
   the ECM being configured to be decrypted with the first transmission key and the content key extracted and validated; and
   the encrypted compressed content being configured to be decrypted with the content key extracted from the ECM by a descrambler, and watermarked by the WM inserter using the pre-marking data and receiving the decrypted content directly from the descrambler.

2. The method of claim 1, wherein the pre-marking data are organized in packets, each packet comprising a signature and a set of records, each record comprising a content index and an alternate value for a given content index.

3. The method of claim 2, wherein each record further comprises an original value at the content index to allow the WM inserter to verify that the value in the content is the same as the original value of the pre-marking record.

4. The method of claim 1, wherein the pre-marking data are embedded into the encrypted content for decryption by the descrambler.

5. The method of claim 1, wherein the pre-marking data and the content are encrypted under the same key.

6. The method of claim 1, wherein the pre-marking data are included in the ECM.

7. The method of claim 1, wherein the ECM comprises access conditions to enable the conditioner to check the access conditions before the content key is transferred to the descrambler.

8. The method of claim 1, wherein the pre-marking data and the content are encrypted under different keys.

9. A server configured to allow watermarking a content by a client device, the server comprising:
   a memory; and
   a processor connected to the memory, the processor being configured to
      encrypt a compressed content by at least one content key;
      generate an entitlement control message (ECM) and pre-marking data, the ECM including the at least one content key, the ECM being encrypted by a first transmission key, the pre-marking data being encrypted and comprising a signature of the pre-marking data;
      send the encrypted compressed content to a client device; and
      send the entitlement control message (ECM) and the pre-marking data to the client device;
   the pre-marking data being formatted to be decrypted by the client device, and in response to a verification of the signature by a conditioner of the client device, transferred from the conditioner to a watermark (WM) inserter of the client device;
   the ECM being configured to be decrypted with the first transmission key and the content key extracted and validated; and
   the encrypted compressed content being configured to be decrypted with the content key extracted from the ECM by a descrambler, and watermarked by the WM inserter using the pre-marking data and receiving the decrypted content directly from the descrambler.

10. The server of claim 9, wherein the pre-marking data are organized in packets, each packet comprising a signature and a set of records, each record comprising a content index and an alternate value for a given content index.

11. The server of claim 10, wherein each record further comprises an original value at the content index to allow the WM inserter to verify that the value in the content is the same as the original value of the pre-marking record.

12. The server of claim 9, wherein the pre-marking data are embedded into the encrypted content for decryption by the descrambler.

13. The server of claim 9, wherein the pre-marking data and the content are encrypted under the same key.

14. The server of claim 9, wherein the pre-marking data are included in the ECM.

15. The server of claim 9, wherein the ECM comprises access conditions to enable the conditioner to check the access conditions before the content key is transferred to the descrambler.

16. The server of claim 9, wherein the pre-marking data and the content are encrypted under different keys.

* * * * *